UNITED STATES PATENT OFFICE.

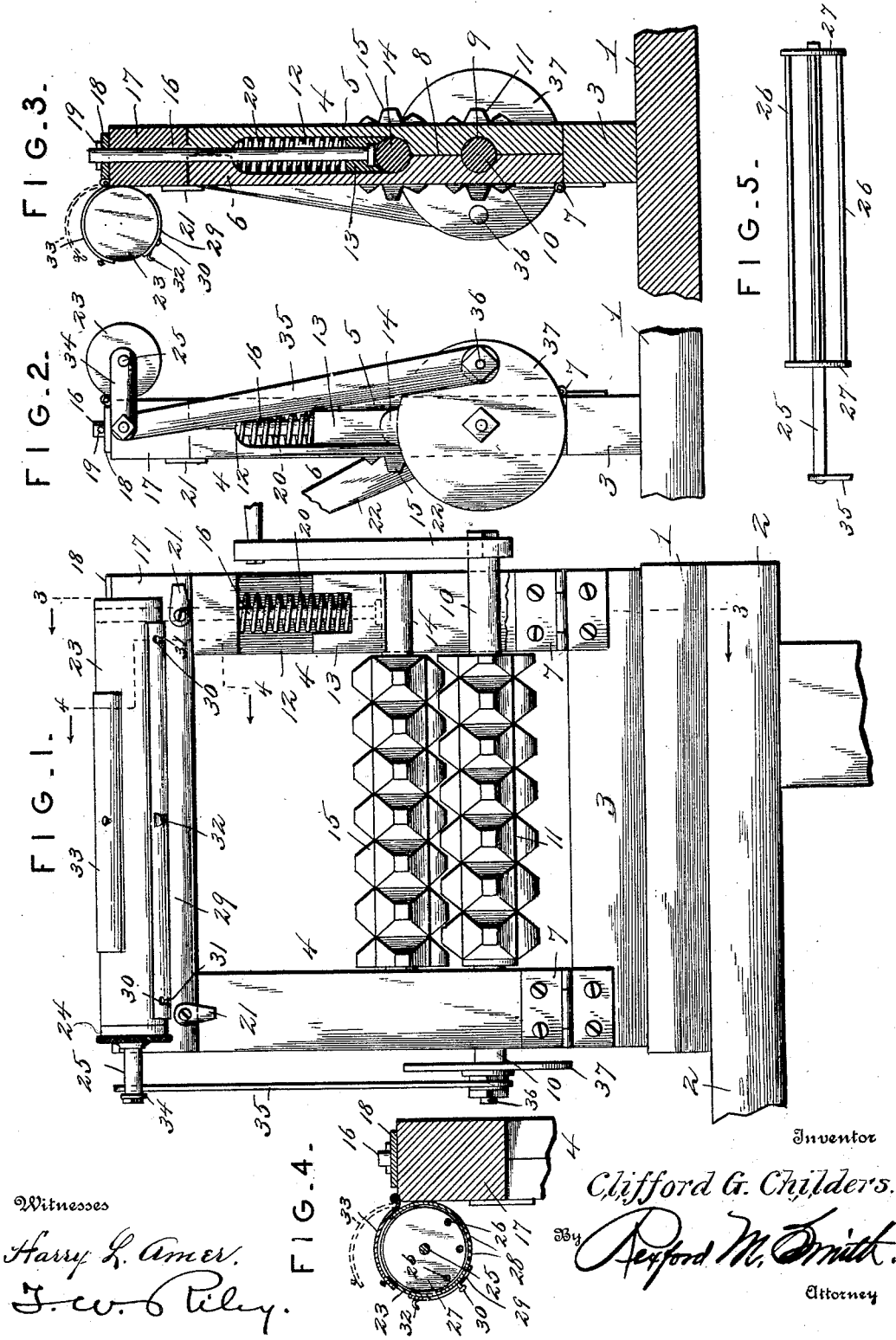

CLIFFORD G. CHILDERS, OF COLORADO SPRINGS, COLORADO.

MEAT TENDERER AND SEASONER.

SPECIFICATION forming part of Letters Patent No. 717,077, dated December 30, 1902.

Application filed March 25, 1902. Serial No. 99,942. (No model.)

*To all whom it may concern:*

Be it known that I, CLIFFORD G. CHILDERS, a citizen of the United States, residing at Colorado Springs, in the county of El Paso and State of Colorado, have invented a certain new and useful Meat Tenderer and Seasoner, of which the following is a specification, reference being had therein to the accompanying drawings.

This invention relates to meat tenderers and seasoners, the object in view being to provide a manually-operated machine by means of which meat may be passed between a pair of toothed rolls and subjected to pressure thereby in such a manner as to render the same tender, the meat being at the same time passed beneath a condiment-holder, which serves to distribute upon and apply to the meat either salt or pepper, or both, as may be desired. A shut-off is employed in connection with the condiment-holder, so that the machine may be used either with or independently of the condiment-distributing device.

Another object of the invention is to provide a novel construction of frame for supporting the tendering-rolls whereby the rolls may be readily removed for cleansing the same.

With the above and other objects in view the invention consists in the novel construction, combination, and arrangement of parts, as hereinafter fully described, illustrated, and claimed.

In the accompanying drawings, Figure 1 is a front elevation of a meat tenderer and seasoner constructed in accordance with the present invention, showing the adjacent section of one of the standards broken away. Fig. 2 is a side elevation of the same. Fig. 3 is a vertical section taken on the line 3 3 of Fig. 1. Fig. 4 is a detail cross-section through the condiment-holder and the cross-head to which it is attached, taken on the line 4 4 of Fig. 1. Fig. 5 is a detail plan view of the agitator.

Like numerals of reference designate like parts in all figures of the drawings.

The frame of the machine comprises a base or foundation board 1 of the approximate width of the machine and of any suitable length, said base-board being adapted to rest upon a table 2 or other suitable support, as shown in Fig. 1, immediately adjacent to the edge of such table or support in order to allow for the revolution of the operating-crank. Extending transversely of the base 1 is a cross-piece 3, at opposite ends of which are arranged standards 4. Each standard comprises a stationary or fixed section 5 and a hinged section 6. The fixed section 5 is fastened rigidly to the cross-piece 3 at the bottom, while the hinged section 6 is connected with the cross-piece by means of a hinge 7. Thus each standard is centrally and longitudinally divided on the line 8, as shown in Fig. 3, the several sections of the standards being recessed, as shown at 9, to form bearings for the journals 10 of the lower toothed tendering-roll 11. The meeting faces of the standard-sections are also recessed, as shown at 12, to form vertical slots or ways, in which sliding boxes 13 are adapted to move, said boxes being provided in their lower sides with semicylindrical bearings for journals 14 of the upper yielding tendering-roll 15.

Each of the boxes 13 has connected therewith and extending upwardly therefrom a stem 16, which projects above the standard proper and passes through an opening in the cross-head 17, which connects the tops of the standards 4. Where the frame thus far described is constructed of wood, a metal plate or strap 18 is extended along the top of the cross-head 17 and formed with openings at suitable points to receive the stems 16, said stems being provided with transverse openings to receive pins 19, which prevent the stems 16 and boxes 13 from moving downward when the journals 14 of the upper roll 15 are removed. Springs 20 encircle the stems 16 within the slots 12 and exert a downward pressure on the boxes 13, and consequently upon the upper yielding roll 15, said springs serving to press the roll 15 downward upon the meat with a yielding pressure, in a manner that will be readily understood. The upper ends of the hinged section 6 are held in place by means of buttons or other suitable fasteners 21, mounted on the cross-head 17.

In order to remove and cleanse the tendering-rolls, the buttons 21 are turned so as to release the sections 6 of the standards, which may then be folded downward to expose the journals 10 and 14 and permit the rolls to be readily removed laterally from their bearings. One of the tendering-rolls has its journal extended to receive an operating-crank 22.

Mounted upon the cross-head 17 is a cylindrical condiment-holder 23, having one end permanently closed and the other end closed by means of a removable screw-cap 24, provided with a central opening for the reception of an oscillatory agitator-shaft 25. The agitator comprises, in addition to the shaft 25, a series of parallel rods or bars 26, connected at their opposite ends to a pair of supporting-disks 27, fast on the shaft 25 and adapted to work close to the bottom wall of the condiment-holder, as shown in Fig. 4. The bottom of the holder 23 is provided with a series of perforations 28, through which the salt and pepper may pass, the said openings being entirely or partially closed or thrown open by means of a segmental slide or cut-off 29, curved to conform to the outer surface of the condiment-holder, as shown in Fig. 4, and held closely against the holder by means of headed pins or studs 30, which are attached to the holder and extend through slots 31 in the cut-off slide, said slide being further provided with a finger piece or grip 32 to facilitate its adjustment. The condiment-holder is further provided on its upper side with an opening to receive the salt and pepper, which opening is normally closed by means of a hinged lid 33.

The shaft 25 is provided at one end with a crank-arm 34, to which is pivotally connected one end of a connecting rod or pitman 35, the opposite end of which is pivotally and detachably connected at 36 with a wheel or disk 37, fast on the extended journal of the same tendering-roll to which the operating-crank 22 is applied.

The combined tenderer and seasoner is placed on a table or other support adjacent to the edge thereof, so that the operating-crank may be revolved or oscillated, the crank being ordinarily operated with the right hand, while the meat is fed between the tendering-rolls with the left hand. After running the meat through the rolls one or more times and after it is sufficiently crushed the cut-off slide of the condiment-holder is moved so as to open the perforations in the bottom thereof. The crank is then operated again until the meat has been sufficiently seasoned, after which the meat is removed from the machine. Any desired seasoning material may be placed in the condiment-holder. To clean the rolls, the buttons 21 are turned, so as to release the hinged sections of the standards, which will then fold downward, leaving the rolls free to be extracted and cleansed without displacing the bearing-boxes of the upper roll. To clean the condiment-holder, the screw-cap 24 is removed and the crank 34 disconnected from the pitman 35. The agitator may then be taken out and cleansed. Thus all parts of the machine are readily accessible for cleaning and may be kept in perfect sanitary condition.

I do not desire to be limited to the details of construction hereinabove set forth, and accordingly reserve the right to make such changes in the form, proportion, and minor details of construction as properly come within the scope of the appended claims.

Having thus described the invention, what I claim as new is—

1. The combination with a meat-tenderer embodying rotatable tendering-rolls, of a stationary condiment-holder, and a movable condiment-agitator geared to one of the tendering-rolls.

2. The combination with a meat-tenderer embodying rotatable tendering-rolls, of a stationary condiment-holder, and an oscillatory condiment-agitator operatively connected with and driven by one of the tendering-rolls.

3. The combination with a meat-tenderer embodying rotatable tendering-rolls, of a stationary condiment-holder having perforations therein, an oscillatory condiment-agitator mounted therein and operatively connected with one of the tendering-rolls, and a cut-off slide for opening and closing the perforations in the condiment-holder.

4. The combination with a meat-tenderer embodying rotatable tendering-rolls, of a stationary condiment-holder, an oscillatory condiment-agitator mounted therein, a crank-arm on the agitator-shaft, a wheel or disk on the shaft of one of the tendering-rolls, and a pitman connecting said wheel or disk with the crank-arm on the agitator-shaft.

5. The combination with a meat-tenderer embodying rotatable tendering-rolls, of a stationary condiment-holder provided with a screw-cap at one end, and an oscillatory condiment-agitator removably mounted in the holder and operatively connected with one of the tendering-rolls.

6. The combination with a pair of tendering-rolls, of a frame comprising a pair of standards each divided longitudinally and consisting of a hinged and fixed section, which sections are recessed in their adjacent faces to receive the journals of the rolls, sliding boxes movable between the recessed portions of the sections and resting on the journals of one of the rolls, stems having means for supporting said boxes upon the removal of the rolls, and springs encircling the stems and exerting pressure against the boxes, substantially as described.

In testimony whereof I affix my signature in presence of two witnesses.

CLIFFORD G. CHILDERS.

Witnesses:
H. D. BROWN,
WM. G. SHAPCOTT.